United States Patent
Gonzalez et al.

(10) Patent No.: US 11,059,080 B2
(45) Date of Patent: Jul. 13, 2021

(54) HOOD FOR FUME EXTRACTOR

(71) Applicant: NOVARC TECHNOLOGIES INC., North Vancouver (CA)

(72) Inventors: Ringo Gonzalez, North Vancouver (CA); Abdolreza Abdollahi, North Vancouver (CA)

(73) Assignee: NOVARC TECHNOLOGIES INC., North Vancouver (CA)

( * ) Notice: Subject to any disclaimer, the term of this patent is extended or adjusted under 35 U.S.C. 154(b) by 22 days.

(21) Appl. No.: 16/181,974

(22) Filed: Nov. 6, 2018

(65) Prior Publication Data

US 2019/0134684 A1     May 9, 2019

Related U.S. Application Data (60) Provisional application No. 62/582,253, filed on Nov. 6, 2017.

(51) Int. Cl.
*B08B 15/02* (2006.01)
*F16L 37/00* (2006.01)
(Continued)

(52) U.S. Cl.
CPC ............ *B08B 15/023* (2013.01); *B08B 15/02* (2013.01); *B08B 15/04* (2013.01); *B23K 9/325* (2013.01);
(Continued)

(58) Field of Classification Search
USPC .............................................. 454/56, 63–67
See application file for complete search history.

(56) References Cited

U.S. PATENT DOCUMENTS 536,097 A * 3/1895 Reading ................ F24B 13/008
126/242
2,312,091 A * 2/1943 Gray ......................... B60S 3/00
134/111
(Continued)

FOREIGN PATENT DOCUMENTS

DE    202013005044 U1   9/2014
WO    2007/030064 A1   3/2007

OTHER PUBLICATIONS

D. Pocock, C.J. Saunders, "Visualisation and control of solder fume exposure", Health and Safety Executive 2011, http://www.hse.gov.uk/research/rrpdf/rr900.pdf.
(Continued)

*Primary Examiner* — Edelmira Bosques
*Assistant Examiner* — Frances F. Hamilton
(74) *Attorney, Agent, or Firm* — Dentons Canada LLP (57) ABSTRACT

A removable hood for a fume extractor comprises a shield defining an internal cavity and having one or more vent openings in an upper portion, a welding opening in a rear portion, one or more viewing openings in one or more sides, and a pipe opening in a bottom portion of the shield. The pipe opening comprises arcuate portions on either side thereof for placement adjacent to a pipe. The hood also comprises a removable attachment mechanism on the upper portion of the shield configured to selectively couple the one or more vent openings to an extraction arm of the fume extractor, one or more layers of window material coupled to the shield to cover each of the one or more viewing openings, and one or more internal airflow spaces shaped to direct air flow to cool the window material when suction is applied to the vent openings.

14 Claims, 10 Drawing Sheets

(51) Int. Cl.
*B23K 26/16* (2006.01)
*B23K 9/32* (2006.01)
*B23K 37/00* (2006.01)
*B08B 15/04* (2006.01)

(52) U.S. Cl.
CPC .............. *B23K 26/16* (2013.01); *B23K 37/00* (2013.01); *F16L 37/004* (2013.01)

(56) References Cited

U.S. PATENT DOCUMENTS

| | | | | |
|---|---|---|---|---|
| 2,378,123 A * | 6/1945 | Beck | ........................ | B08B 15/04 454/63 |
| 2,394,176 A * | 2/1946 | Hillebrand | ............ | F24C 15/045 126/200 |
| 2,580,957 A * | 1/1952 | Reeves | ................. | F24C 15/045 126/200 |
| 3,137,546 A * | 6/1964 | Lamb | ..................... | F26B 11/188 34/371 |
| 3,727,540 A * | 4/1973 | Galluzzo | ................. | B08B 15/00 454/67 |
| 3,820,627 A * | 6/1974 | Wirt | .................... | B23Q 11/0046 181/225 |
| 3,980,008 A * | 9/1976 | Martin | ..................... | B08B 15/02 454/65 |
| 3,991,738 A * | 11/1976 | Krebs | ..................... | F24C 15/04 126/200 |
| 4,121,560 A * | 10/1978 | Knight | ..................... | F24B 1/02 126/521 |
| 4,248,203 A * | 2/1981 | Willson | ................... | F24B 5/026 126/77 |
| 4,505,190 A * | 3/1985 | Fink | ....................... | B08B 15/026 138/97 |
| 4,961,442 A * | 10/1990 | Crespin | ..................... | G21F 9/00 137/312 |
| 5,056,422 A | 10/1991 | Horntvedt | | |
| 5,251,608 A * | 10/1993 | Cote | .................... | F24C 15/2028 126/299 D |
| 5,531,213 A * | 7/1996 | Berlaimont | ................ | F23L 9/00 126/193 |
| 5,655,962 A * | 8/1997 | Pfeiffer, Jr. | ........... | B08B 15/005 104/52 |
| 5,685,771 A * | 11/1997 | Kleppen | ................ | B08B 15/026 219/72 |
| 5,811,055 A * | 9/1998 | Geiger | .................. | B23K 9/0061 266/48 |
| 6,332,837 B1 * | 12/2001 | Wilk | ....................... | B08B 15/04 454/63 |
| 6,648,748 B1 * | 11/2003 | Ferlin | ................... | B08B 15/002 454/65 |
| 7,198,567 B2 * | 4/2007 | Casey | ................... | B08B 15/002 454/49 |
| 7,318,771 B2 * | 1/2008 | Huang | ..................... | B25H 1/20 454/61 |
| 9,839,948 B2 * | 12/2017 | Leisner | ................. | B08B 15/002 |
| 10,384,243 B2 * | 8/2019 | Wang | ........................ | B01L 1/04 |
| 10,495,305 B2 * | 12/2019 | Lambkin | ............... | F24C 15/024 |
| 10,718,529 B2 * | 7/2020 | Phillips | ................. | F24C 15/045 |
| 2008/0076341 A1* | 3/2008 | Wardlaw | ................. | F16L 55/18 454/63 |
| 2010/0066082 A1 | 3/2010 | Aubert et al. | | |
| 2010/0276396 A1* | 11/2010 | Cooper | ................... | B23K 9/325 219/74 |
| 2011/0186556 A1* | 8/2011 | Heinrich | .............. | B23K 9/0282 219/136 |
| 2013/0244558 A1 | 9/2013 | Hammers et al. | | |
| 2013/0244560 A1* | 9/2013 | Hammers | ............ | B23K 26/142 454/63 |
| 2016/0102865 A1* | 4/2016 | Bolton | .................... | F24B 5/026 126/75 |

OTHER PUBLICATIONS

Extract from website for Plymovent Magnetic Grabber, 2018, https://www.plymovent.com/us/oil-mist-removal/products/vehicle-exhaust-extraction/nozzles/magnetic-grabber.

* cited by examiner

HOOD FOR FUME EXTRACTOR

CROSS REFERENCE TO RELATED APPLICATION

This application claims the benefit of priority of U.S. Provisional Patent Application No. 62/582,253 filed on Nov. 6, 2017, which is hereby incorporated herein by reference in its entirety.

FIELD

The present disclosure generally relates to the field of fume extractors and hoods.

BACKGROUND

Fume extraction equipment can remove fumes and airborne particles from an industrial workplace. Fume extraction equipment can include, for example, a fume extractor for welding, soldering, or volatile organic compound (VOC) fumes. For example, a welding process can generate fumes that can be extracted by a fume extractor. The inventor has determined a need for improved fume extraction apparatus.

SUMMARY

In accordance with one aspect, there is provided a removable hood for a fume extractor having features described herein.

In accordance with another aspect, there is provided a removable hood for a fume extractor, the removable hood comprising a shield for substantially covering a welding area. The shield defines an internal cavity and has one or more vent openings in an upper portion of the shield in fluid communication with the internal cavity, a welding opening in a rear portion of the shield for permitting introduction of a welding torch into the internal cavity, one or more viewing openings in one or more sides of the shield, and a pipe opening in a bottom portion of the shield, the pipe opening comprising arcuate portions on either side thereof for placement adjacent to a pipe. The hood also comprises a removable attachment mechanism on the upper portion of the shield configured to selectively couple the one or more vent openings to an extraction arm of the fume extractor, one or more layers of window material coupled to the shield to cover each of the one or more viewing openings, and one or more internal airflow spaces shaped to direct air flow to cool the one or more layers of window material when suction is applied to the one or more vent openings.

In accordance with another aspect, there is provided a removable hood for a fume extractor, the removable hood having one or more windows, the removable hood having one or more grills for airflow, the removable hood having one or more removable attachment mechanisms for removable attachment to the fume extractor.

In accordance with another aspect, there is provided a removable hood for a fume extractor, the removable hood having one or more windows, the removable hood having one or more grills for airflow, the removable hood having one or more removable attachment mechanisms for removable attachment to the fume extractor, the removable hood having a bottom opening shaped and sized to fit over a pipe.

In accordance with another aspect, there is provided a removable hood for a fume extractor, the removable hood having a plurality of sides, the hood have one or more windows on a corresponding one or more sides of the plurality of sides, the removable hood having removable attachment mechanisms for removable attachment to the fume extractor, the removable hood having one or more grills for airflow.

In accordance with another aspect, there is provided a removable hood for a fume extractor, the removable hood having a plurality of sides, the hood having one or more windows on a corresponding one or more sides of the plurality of sides, the removable hood having one or more grills adjacent to the interior of the corresponding one or more sides, the grills having one or more openings that are aligned with the one or more windows, the removable hood having removable attachment mechanisms for removable attachment to the fume extractor.

In accordance with another aspect, there is provided a removable hood for a fume extractor, the removable hood having one or more windows, the removable hood having one or more top openings and a bottom opening, the removable hood having one or more grills for directing airflow from the bottom opening to the one or more top openings, the removable hood having one or more removable attachment mechanisms for removable attachment to the fume extractor.

In accordance with another aspect, there is provided a removable hood, wherein the grills direct the airflow from the bottom opening to the one or more top openings through one or more air channels.

In accordance with another aspect, there is provided a removable hood, comprising a first air channel that directs airflow from the bottom opening to the one or more top openings along an interior side of the removable hood.

In accordance with another aspect, there is provided a removable hood for a fume extractor, the removable hood having a plurality of sides, the hood have one or more windows on a corresponding one or more sides of the plurality of sides, the removable hood having removable attachment mechanisms for removable attachment to the fume extractor, the removable hood having one or more grills for airflow to cool the one or more windows.

In accordance with another aspect, there is provided a fume extraction system comprising a fume extractor and a removable hood, the removable hood having one or more windows, the removable hood having one or more grills for airflow, the removable hood having one or more removable attachment mechanisms for removable attachment to the fume extractor.

In accordance with another aspect, there is provided a welding system comprising welding apparatus, a fume extractor and a removable hood, the removable hood having one or more windows, the removable hood having one or more grills for airflow, the removable hood having one or more removable attachment mechanisms for removable attachment to the fume extractor.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DETAILED DESCRIPTION

Embodiments of methods, systems, and apparatus are described through reference to the drawings. Embodiments relate to hoods for fume extraction systems and related apparatus and methods. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The present disclosure provides various embodiments of a hood for attachment to a fume extractor. The hood can removably attach to the fume extractor for use in relation to a variety of welding apparatus. The hood can be referred to herein as a removable hood.

In an embodiment, the removable hood has attachment mechanisms for removable attachment to a head of an extraction arm of the fume extractor. In some embodiments, the attachment mechanisms are removable. An example fume extractor is a mobile fume extractor for welding systems. A mobile fume extractor can have an extraction arm coupled to a vacuum and filtration system designed for extraction and filtration of welding fume. An example mobile fume extractor is the Lincoln Electric™ mobiflex fume extractor, but the removable hood can be used with a variety of other fume extractors known to a person skilled in the art.

The removable hood has a body having an internal cavity where potentially hazardous processes such as welding take place. For example, in welding, fumes generated by welding are retained in the internal cavity and are extracted by the fume extractor. In an embodiment, the removable hood has a top opening located generally at the top of the body. In other embodiments, the removable hood has one or more top openings. When the removable hood is attached to the fume extractor, the internal cavity is in fluid communication with the extraction arm of the fume extractor through the top opening, thereby allowing the fume extractor to suction off the fumes generated in the internal cavity.

FIGS. 1, 1A, 1B, 1C and 1D show an example removable hood 100 according to one embodiment. The hood 100 comprises a shield 110 which substantially encloses an internal cavity where welding can take place. The shield 110 has one or more vent openings 112 in an upper portion thereof, and a removable attachment mechanism 120 for coupling the hood 100 to an arm of a fume extractor (not shown in FIGS. 1-1D). In the illustrated example, the attachment mechanism 120 comprises an attachment frame 122 extending upwardly from around the one or more vent openings 112. A plurality of magnets 124 are mounted on the top of the attachment fame 122, and h are positioned to engage corresponding magnetic elements on the extractor arm, or on an adaptor attached to the extractor arm, such that when the extractor arm applies suction, air is drawn from the internal cavity of the shield 110, through the one or more vent openings 112 and the attachment frame 122, and into the extractor arm.

The shield 110 also has a welding opening 114 in a "rear" portion thereof for receiving a welding torch (such as for example a torch of a robotic welding system as described below). As used herein, the term "rear" refers to the direction from which the welding torch enters the interior cavity of the shield 110. The welding opening 114 may have rearwardly extending flanges 115 on either side thereof to provide additional shielding from welding operations.

The shield 110 also has a pipe opening 116 in a bottom portion thereof. The pipe opening 116 has arcuate portions 117 on either side thereof for placement adjacent to a pipe being welded. In some embodiments, the arcuate portions 117 each have a radius equal to the radius of the pipe. In some embodiments, the radius of the arcuate portions 117 is selected based on the size of the pipe. In some embodiments, the arcuate portions 117 are formed by removable panels attached to a lower portion of the shield 110, which may be replaced to accommodate pipes of different sizes. In some embodiments, a skirt or curtain 117A (see FIG. 1) made from a heat resistant flexible material (such as, for example rubber, silicon, or another suitable material) may be provided around the pipe opening 116 to conform to the shape of the pipe.

Figure 1:
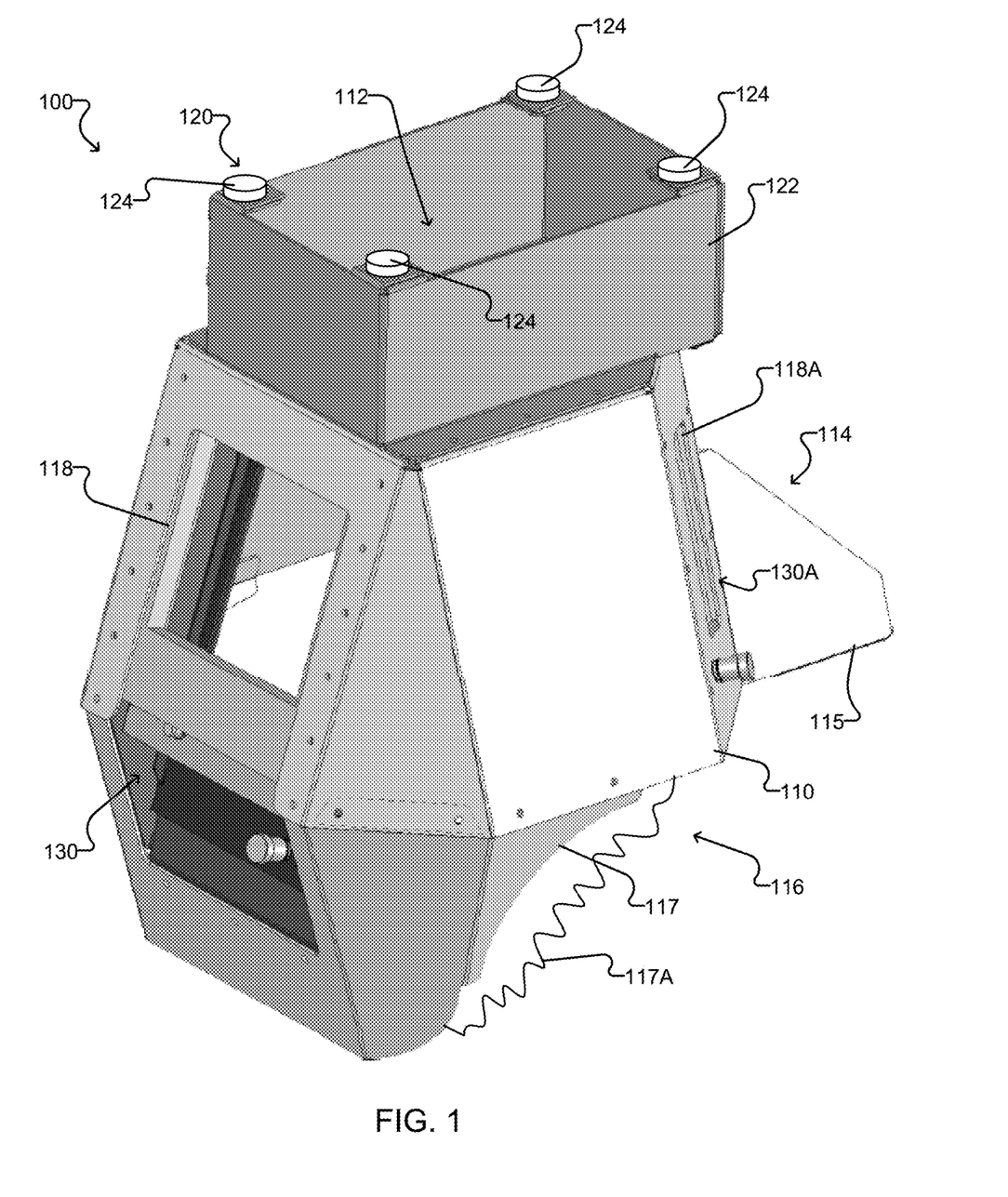
FIG. 1 shows an example hood for attachment to a fume extractor.
Figure 1A:
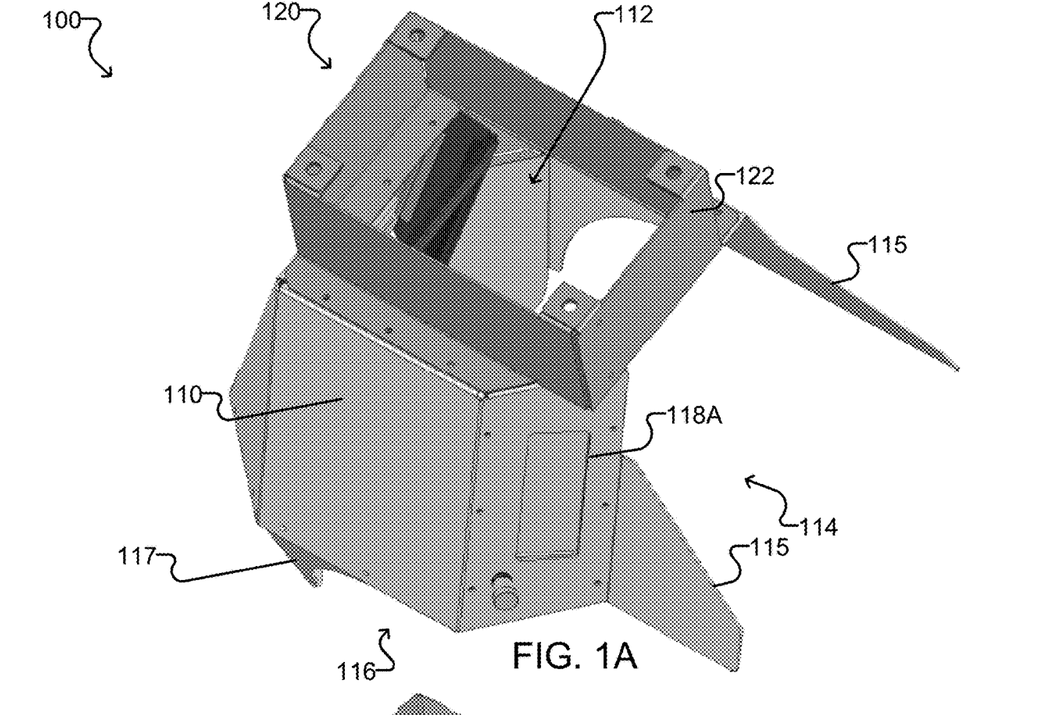
FIG. 1A shows a rear top perspective view of the hood of FIG. 1.
Figure 1B:
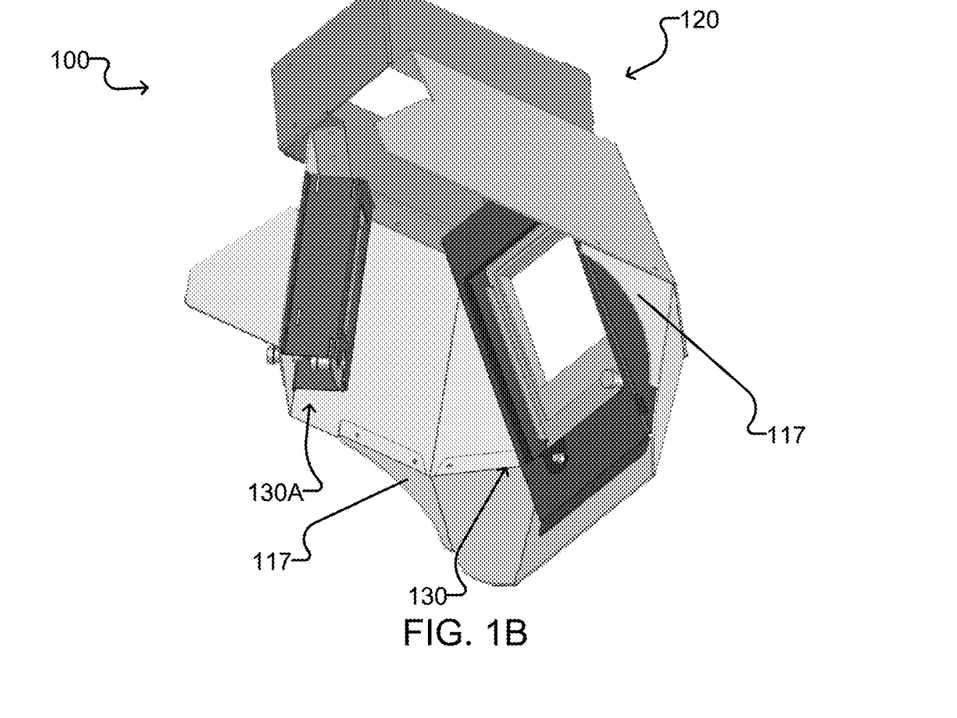
FIG. 1B shows a rear bottom perspective view of the hood of FIG. 1.

The shield 110 also has one or more viewing openings 118 in one or more sides thereof. In the illustrated example, the shield has a first viewing opening 118 in a "front" side thereof (i.e. the side opposite the welding opening 114), and a second viewing opening in a rear left side thereof. Each viewing opening 118/118A is covered by one or more layers of transparent window material, such as for example, auto-darkening filters, heat shields, shaded glass, or other suitable materials. In the illustrated example, the layers of window material are held in a window assembly 130/130A coupled to the corresponding viewing opening 118/118A and forming a grill for directing air flow to cool the window material, as described below. As best seen in FIG. 1B, the window assemblies 130 and 130A may be riveted or otherwise secured to the inside of the shield 110 about the viewing openings 118 and 118A.

Figure 1C:
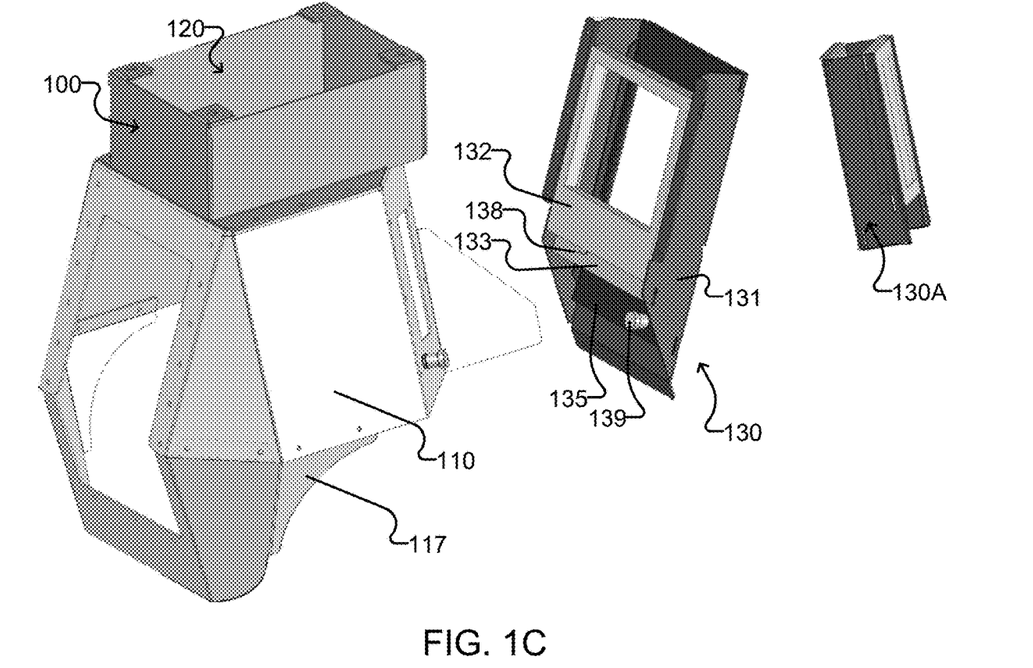
FIG. 1C shows an exploded view of the hood of FIG. 1.
Figure 1D:
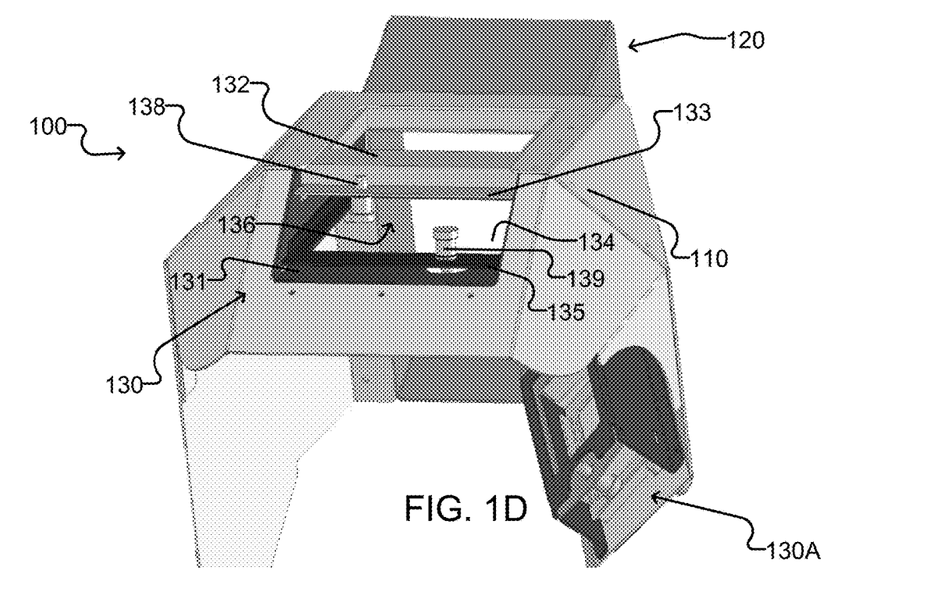
FIG. 1D shows a hood similar to the hood of FIG. 1 with an auto-darkening filter and heat shield installed within a window assembly.

With reference to FIGS. 1C and 1D, window assembly 130 comprises a grill frame 131 configured to support two layers of window material. In the illustrated example, the grill frame 131 comprises first and second window material supports 133 and 135. The first window material support 133 is configured to hold an auto-darkening filter 132 in place, and has a first spring pin 138 for retaining the filter 132 and allowing the filter 132 to be removed and/or replaced. The second window material support 135 is configured to hold a heat shield 134 in place, and has a second spring pin 139 for retaining the heat shield 134 and allowing the heat shield 134 to be removed and/or replaced. A grill is formed by the filter 132 and the heat shield 134 and defines an internal airflow space 136 therebetween, such that when suction is applied to the one or more vent openings 112, external air is drawn through the airflow space 136 to cool the window materials. Window assembly 130A may be constructed substantially similarly to window assembly 130.

Another example of a removable fume hood 200 is illustrated in FIGS. 2A-2I. The removable hood can have various shapes, for example, cubic, spherical, or conical. In some embodiments, the body of the removable hood has one or more windows. In some embodiments, the body has one or more sides. In an embodiment, the removable hood has windows on one or more sides. In an embodiment, the body of the removable hood has an open bottom. In some embodiments, the components of the removable hood can be positioned differently relative to each other. For example, the removable hood can have an opening on a side adjacent to where welding operations are performed, where the opening provides fluid communication between a cavity of the hood and the extraction arm of the fume extractor.

Figure 2A:
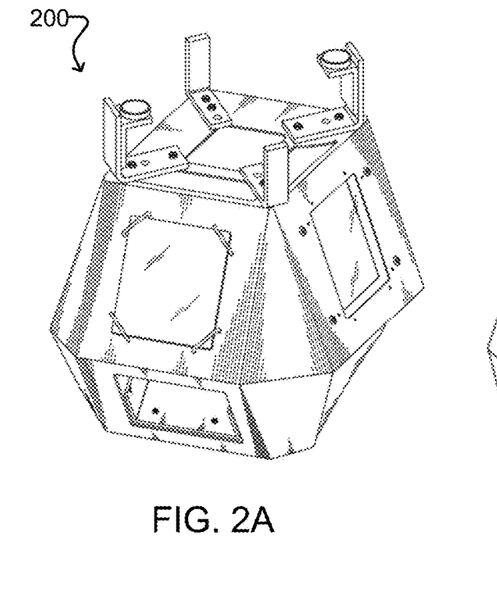
FIG. 2A shows a perspective front view of an example hood for attachment to a fume extractor.
Figure 2B:
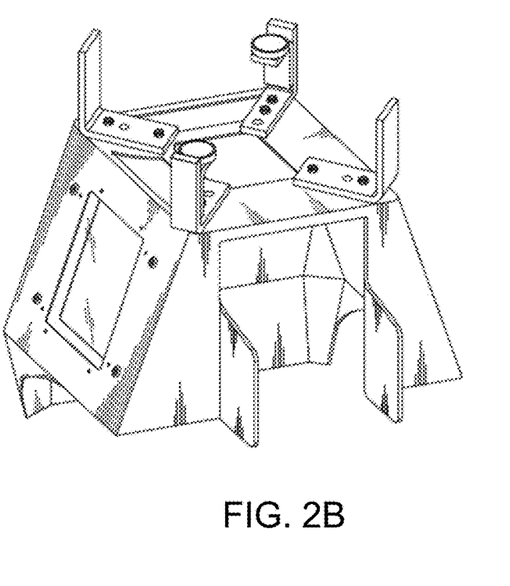
FIG. 2B shows a perspective back view of an example hood for attachment to a fume extractor.
Figure 2C:
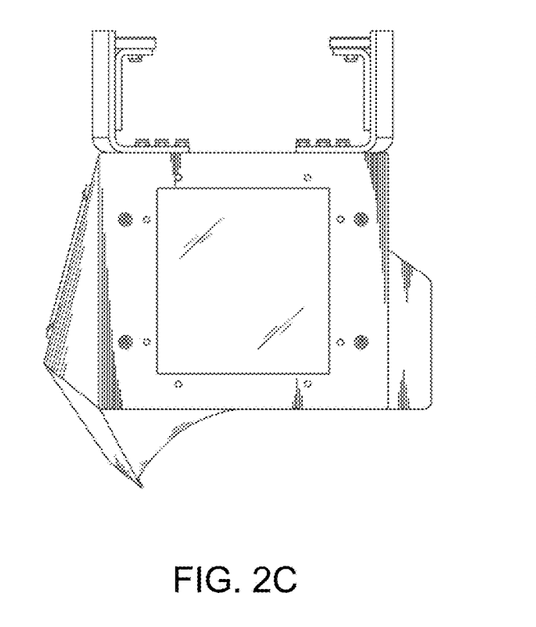
FIG. 2C shows a front view of an example hood for attachment to a fume extractor.
Figure 2D:
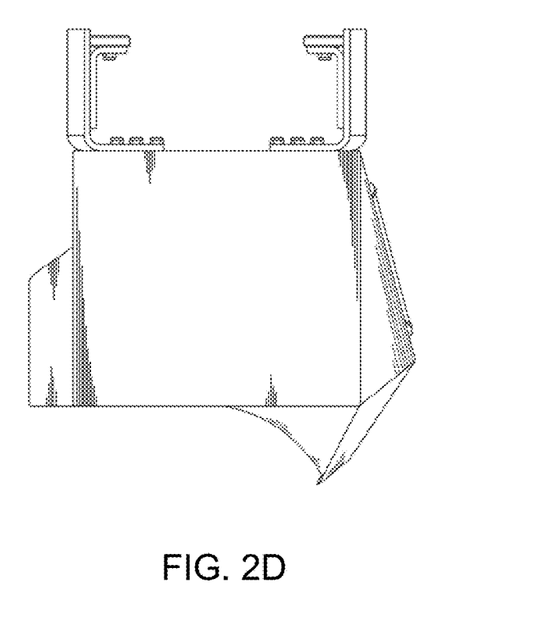
FIG. 2D shows a back view of an example hood for attachment to a fume extractor.

Turning to the embodiment shown in FIG. 2A, the removable hood has first window on a front side, and a second window on a right side. Other configurations of the window are also possible. For example, the removable hood may have one window, a window on each side, or multiple windows on each side, or various combinations thereof. The removable hood can collect fumes from the welding process and allows the operator to see the weld through its windows. The windows can be made out of material allowing an operator to safely view welding inside the hood. For example, the windows can be made out of heat resistant glass. In some embodiments, the windows are heat resist glasses rated for arc welding.

Figure 2E:
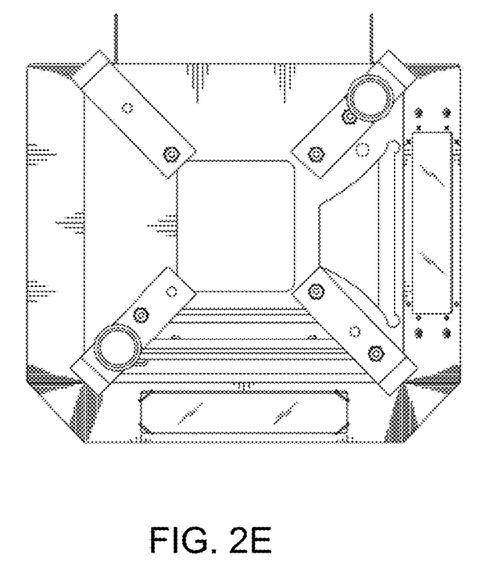
FIG. 2E shows a top view of an example hood for attachment to a fume extractor.
Figure 2F:
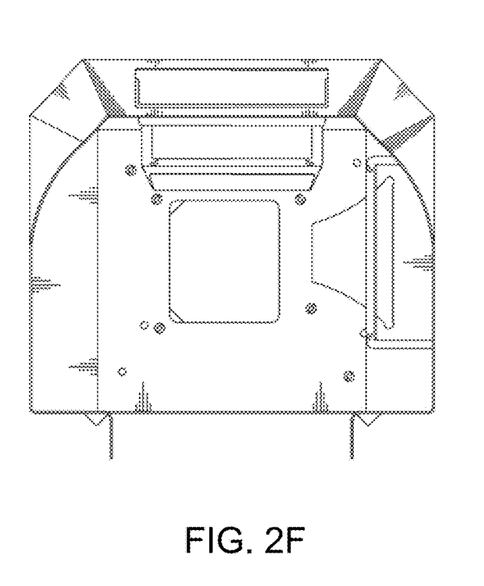
FIG. 2F shows a bottom view of an example hood for attachment to a fume extractor.
Figure 2G:
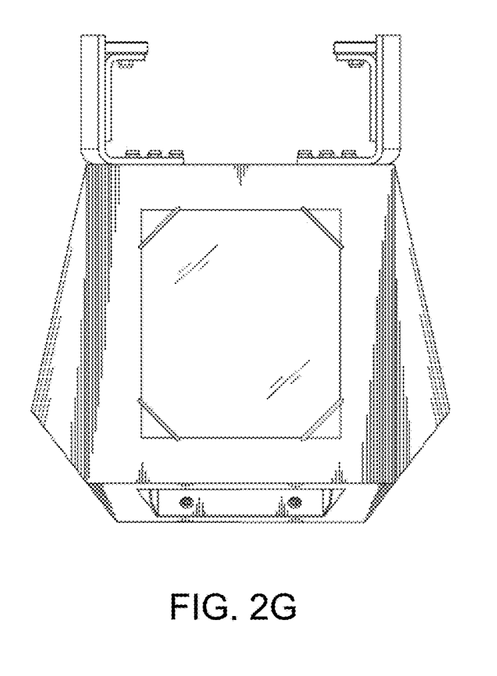
FIG. 2G shows a left side view of an example hood for attachment to a fume extractor.
Figure 2H:
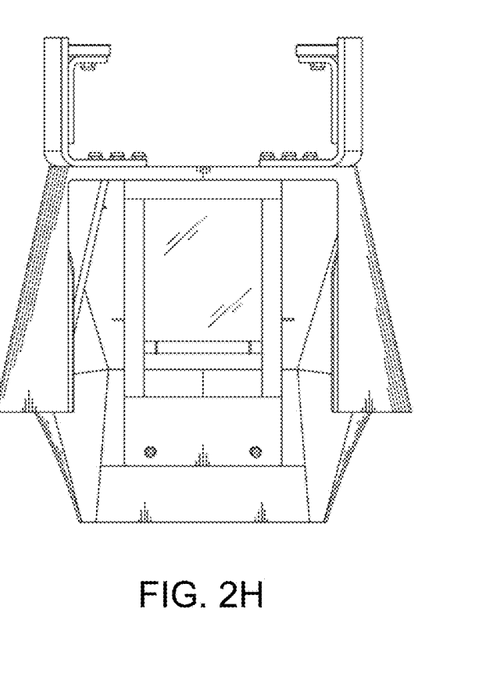
FIG. 2H shows a right side view of an example hood for attachment to a fume extractor.

In FIG. 2E, a removable hood is shown having an example attachment mechanism to connect the hood with a fume extractor. In this example, the attachment mechanism comprises four L-shaped arms, two of which have a magnet at one end. (In other embodiments, each arm has a magnet at its end.) The magnets are adapted for attachment to corresponding magnets disposed on the extraction arm of the fume extractor. This attachment mechanism can be removable. The removable attachment mechanisms can be magnets on the top of the hood that attach to inside the fume extractor head. The magnets can be positioned in a particular configuration on the hood, for example, to optimize attachment, mobility or ease of manoeuvrability. As shown, the attachment mechanism can include a plurality, such as four, "L"-shaped appendages affixed onto the top of the hood, such as by screws, welding, or other means. There can be more or less than four appendages in other embodiments. In an embodiment, each appendage is positioned on each of four corners of the hood. A magnet can be position at the distal end of one or more of these appendages. For example, in some embodiments magnets are affixed to two appendages. In some examples, the two appendages are opposite each other. The magnets and the appendages provide an attachment mechanism for a hood to engage with a fume extractor. In an embodiment, the two appendages have magnets affixed at the distal ends thereof, while two other appendages engage the arm of the fume extractor by frictional engagement. For example, each of the two appendages can facilitate attachment with a fume extractor by tight coupling with an inside or outside of a rim of the arm of a fume extractor opening. The tight coupling can be maintained by friction or wedging, for example. Frictional engagement can be used with other engagement using one or more magnets, latches, or ties, for example, to provide an attachment mechanism for a hood to engage with a fume extractor. The attachment mechanism can provide a tight seal, for example, to allow suction or air flow to optimize the carrying of fumes from a cavity in the hood to a fume extractor. In some embodiments, an attachment mechanism can be provided as a magnet (or, e.g., latch or tie) on each distal end of each of the plurality of appendages positioned on a hood to provide a balanced or optimized support for attachment to a fume extractor. In other embodiments the removable attachment mechanisms can be clips, latches, fasteners, cables, or other attachment mechanisms, for example.

Figure 2I:
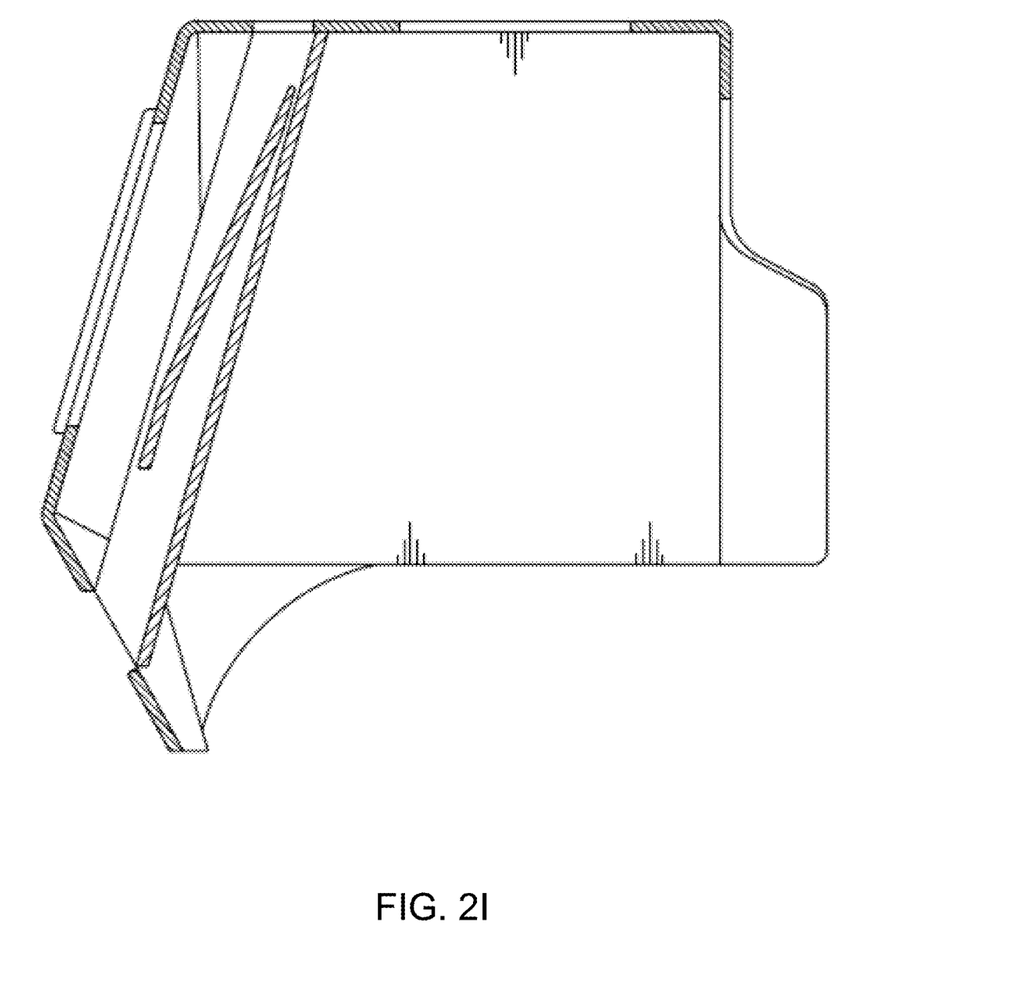
FIG. 2I shows a sectional view from the right of an example hood for attachment to a fume extractor.

Turning to FIG. 2I, the removable hood can have one or more grills, which are structures shaped to guide air flow. In some embodiments, the one or more grills guide air flow into the hood and out through the one or more top openings. In some embodiments, a grill can be positioned relative to a window for creating a stream of cooling air to reduce the temperature of the windows. A grill is shaped to direct airflow to cool the window material. The grills can be arranged in a particular direction, with a particular size and number of openings to guide air flow, for example, to optimally cool the window material.

Figure 3:
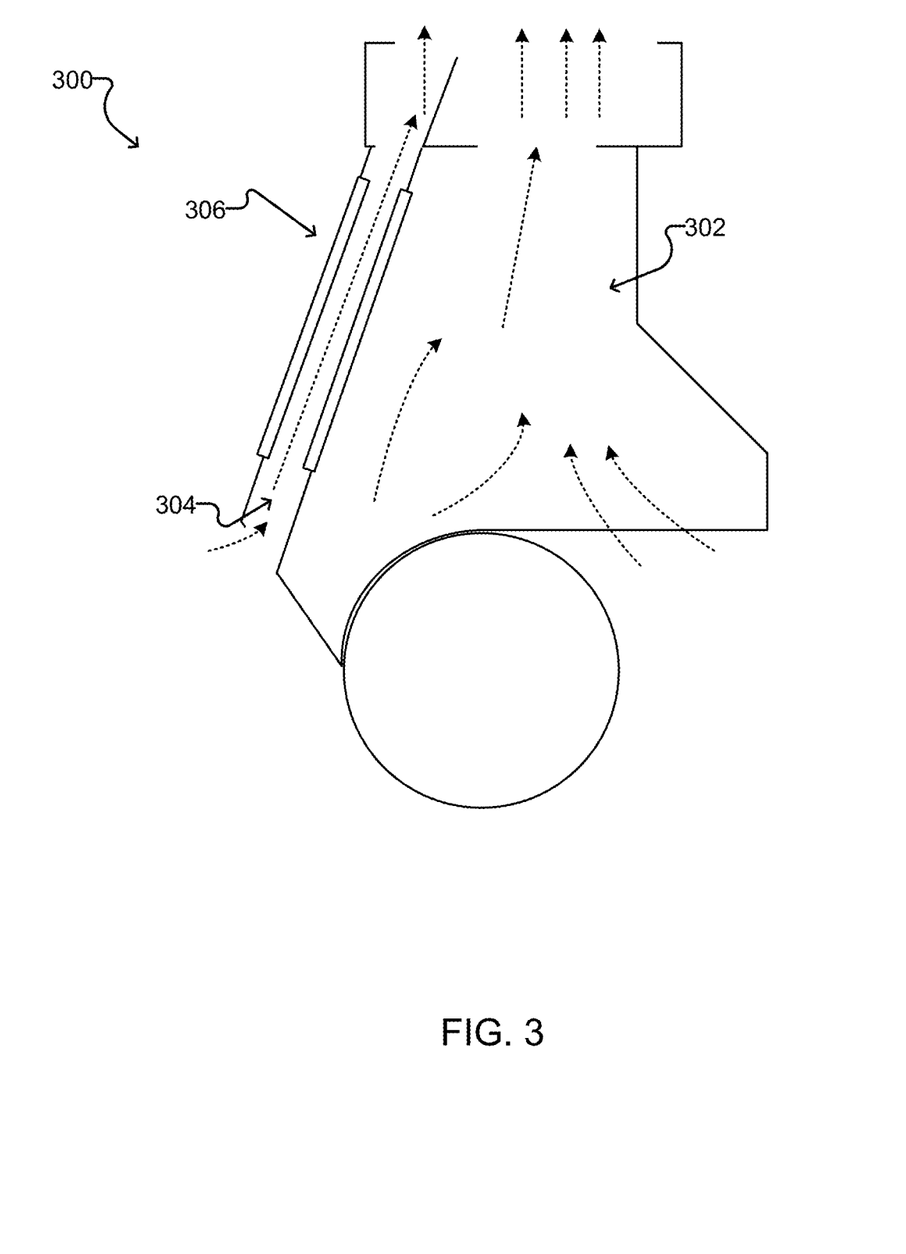
FIG. 3 shows a diagram of air flow through an example hood.

FIG. 3 shows a diagram representing example air flow (illustrated by the dotted arrows in FIG. 3) through a removable hood 300. During operation, sparks from welding operations takes place within the internal cavity 302 of a removable hood attached to a fume extractor. Fumes from welding are pulled or suctioned from the internal cavity 302 and towards the fume extractor through the one or more vent openings. In addition to the internal cavity 302, the removable hood can also have one or more internal airflow spaces 304, each adjacent to one or more windows 306. The internal airflow spaces are defined by the grills to direct air flow through the internal airflow spaces to the fume extractor. This air flow can be directed by the grills to provide a particular or controlled amount of air to cool the window material.

To allow an operator to see into the internal cavity through a window having a grill, the grill can have, for example, one or more window panes made of shaded glass. The one or more window panes are positioned or aligned with the window, such that an operator can view welding operations inside the removable hood. The internal airflow space can allow air to flow along the plane of the window material and towards the fume extractor through the one or more top openings, as shown. As shown in FIG. 3, air is drawn into the removable hood through the bottom opening. Welding operations can be performed on a segment of a pipe covered by the removable hood.

Figure 4:
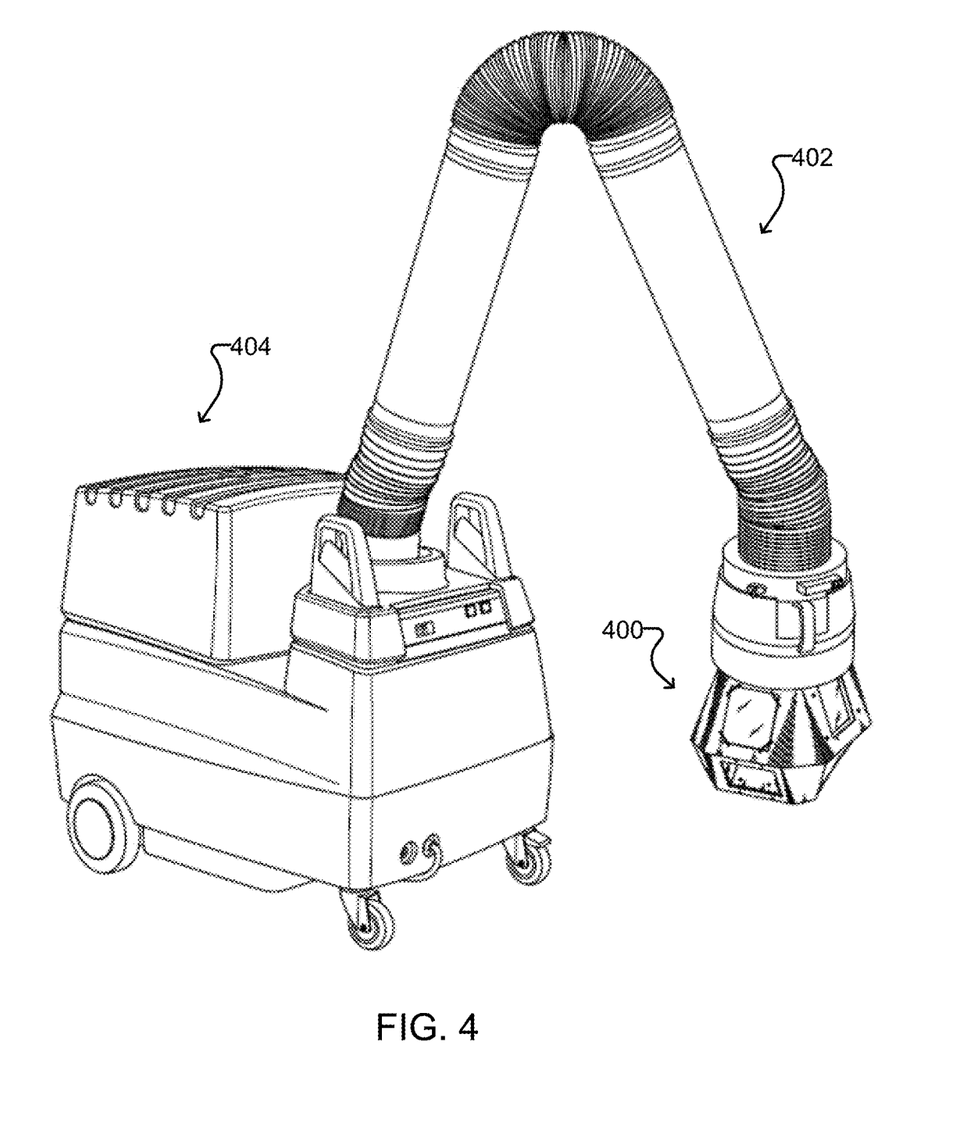
FIG. 4 shows an example hood attached to the end of a fume extractor.

FIG. 4 shows a removable hood 400 attached to the arm 402 of a fume extractor 404. The hood 400 can be moved to a desired position over a welding site by repositioning the arm 402.

Figure 5:
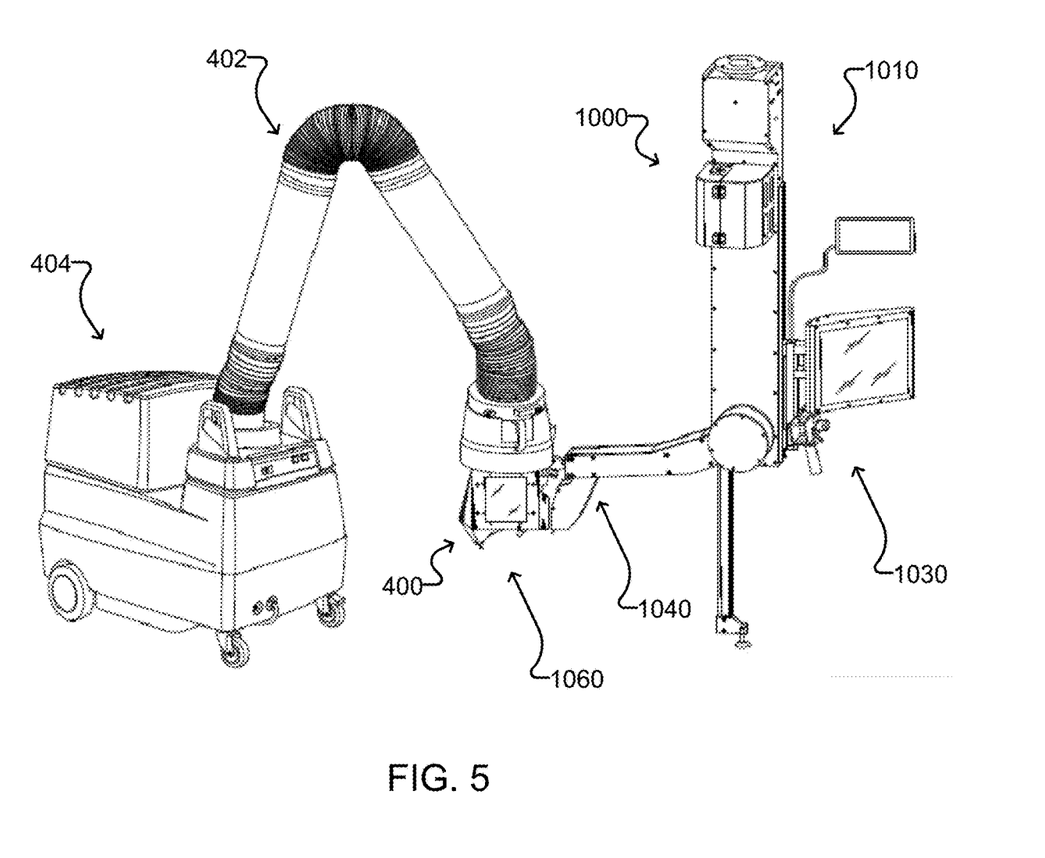
FIG. 5 shows an example hood attached to a fume extractor with a robotic welding system positioned with its torch under the hood.

Example embodiments described herein can be used in relation to robotic welding assemblies. FIG. 5 shows an example fume extractor 404 and hood for use with a robotic welding system 1000. The robotic welding system 1000 comprises a supporting arm 1010 having a welding arm 1040 configured to hold a welding torch 1060 coupled thereto. The welding arm 1040 extends in a generally horizontal direction toward a "front" or "welding" side of the supporting arm 1010. A welder control assembly 1030 is attached to a "back" or "operator" side of the supporting arm 1010. The welder control assembly 130 comprises user interface elements operably connected to the controller that controls the operation of various actuators of the robotic welding system 100. In the illustrated example, the welder control assembly 1030 comprises a handle, a support structure control, an emergency stop, and a touch screen display interface. An operator control pendant may also be provided for facilitating real-time interaction with the robotic welding system 1000, for example by allowing a welder to interrupt or adjust a welding program being executed by the robotic welding system 1000. The welder control assembly 1030 may comprise hooks or the like (not shown) for holding the pendant when it is not being held by an operator.

Figure 6:
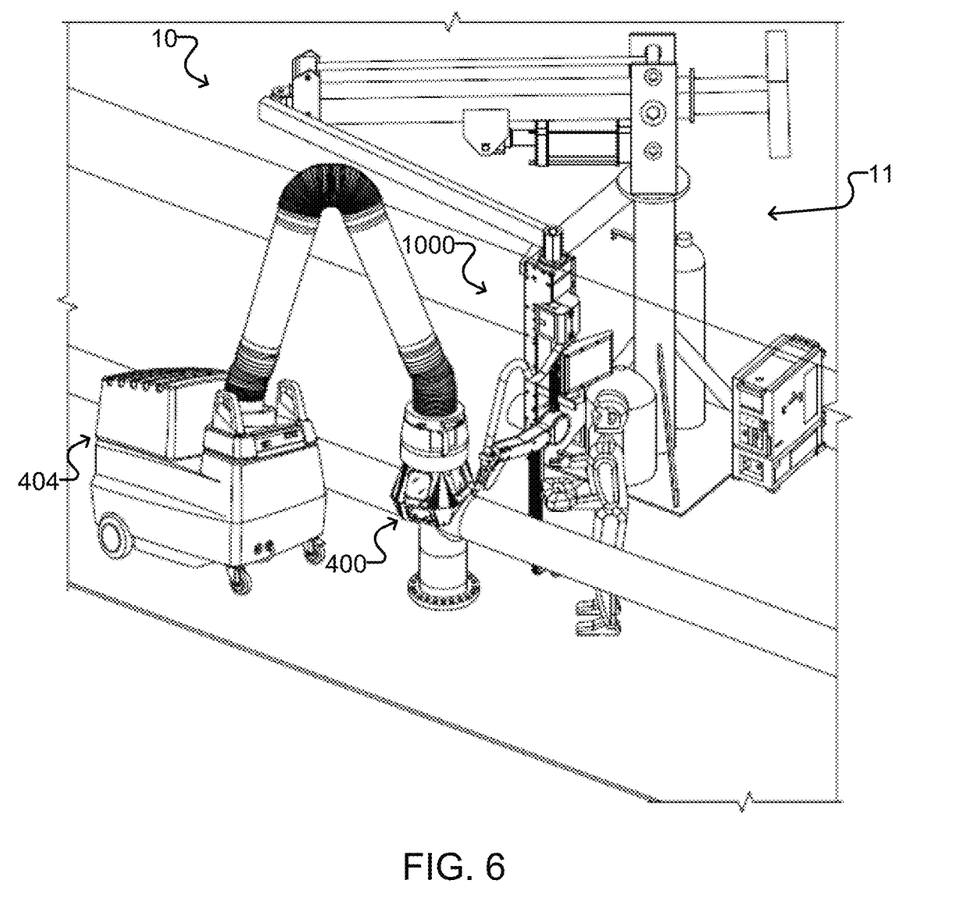
FIG. 6 shows an example hood attached to a fume extractor with and example welding apparatus comprising a robotic welding system supported by a repositionable support structure set up for a pipe welding operation.

FIG. 6 shows an example fume extractor 404 and hood 400 for use with an example welding apparatus 10 comprising a repositionable support structure 11 supporting a robotic welding system 1000. This is an example and the hood for the fume extractor can be used with a variety of welding apparatus. The robotic welding system 1000 can be a "collaborative" robotic system, meaning that it is configured to be safely used alongside human operators. The present disclosure describes an example collaborative robotic welding system 1000 configured to be supported by the repositionable support structure 11 such that an operator can move around a work area, but it is to be understood that the collaborative robotic welding system 1000 described herein could be configured for use with other types of repositionable support structures. The example welding apparatus 10 of FIG. 6 allows the robotic welding system 1000 to be positioned at various heights and horizontal locations to weld workpieces at variable distances from the base of the repositionable support structure 11. In some embodiments, the repositionable support structure 11 is configured to support the robotic welding system 100 at various locations to support welding at different desired positions. The range of welding locations spanned by the apparatus 10 can vary depending on the size and configuration of the repositionable support structure 11.

Further details regarding the welding apparatus 10 and welding system 1000 are provided in International Application No. PCT/CA2017050371, the entire contents of which is hereby incorporated by reference. These are examples only and embodiments described herein can be used in relation to a variety of robotic welding apparatus or for different processes that generate fumes to be extracted.

Removable hoods according to the present disclosure can help welders attend to welding operations at a welding system. For example, the hood can improve welder productivity. For automated welding, the hood can provide the operator with the freedom of moving and do other tasks close to the welding operation or to operate another station. This can make the operator's job easier and more ergonomic. The hood can improve safety of welding operations. The hood confines fumes (e.g., from welding operations) and directs it to an extractor. The hood can also operate as a flash screen and protect an operator and others (e.g., in the same room) from extreme arc light. This can be an improvement over hand held or helmet devices that may protect at most the one operator holding or wearing the device. The hood can allow operators to use both hands for other tasks and can protect all people who could be affected by harmful fumes and light.

Removable hoods according to the present disclosure can collect fumes from the welding and direct air flow carrying the fumes to a fume extractor attached to the hood. The hood can have one or more bottom openings that can draw air through an internal airflow space adjacent to the window material (e.g., heat-tempered glass) and direct or guide the air to the fume extractor. The air can be optimally guided using grills. For example, the internal airflow space can operate as a tunnel adjacent to window material to draw air across the window material. In some embodiments, the hood can be configured to cool window material using air flow in different ways.

For example, the internal airflow space may be separate from the internal cavity. Alternatively, the internal airflow space may be continuous or in fluid communication with the internal cavity, having grills or panels oriented or positioned such that the grills or panels guide air flow across window material. In some embodiments, air flow can be guided across only particular portions of the window material to optimally cool the window material. For example, it may be optimal to cool only selected portions of the window material to cool the window material more quickly or using less air or less power, for example. In some embodiments, the grills can be oriented or positioned in a way that provides cooling to window material and is compatible with different fume extractor designs.

In some embodiments, a hood can have more than one window that allows an operator to view the inside of the hood, for example, where welding is performed. The top of the hood can contain an opening and attachment means. The attachment means can be configured to align the hood with a fume extractor such that the opening is aligned with an opening of the fume extractor so air can flow from through the hood to the fume extractor. This configuration can allow the hood to collect all fumes for extraction.

In some embodiments, the top of the hood has a first vent opening for suctioning fumes out of the internal cavity. In some embodiments, the hood has one or more second vent openings. The one or more second vent opening provides an exit for air that flows through the internal airflow spaces, which allow cooling of the hood's window material (e.g., shaded, heat-resistant glass) to be cooled. In some embodiments, each window can have an adjacent internal airflow spaces or air channels, each with an opening that allows cooling of the respective window material, for example, openings that provide fluid communication with a fume extractor.

In some embodiments, the hood has more than one window (e.g. two windows), and an internal airflow space for cooling one of the windows, and a top opening where fumes can be extracted and provided to a fume extractor. In some embodiments, the grills define internal airflow spaces (e.g., formed by a metal attachment) and covers the windows. The internal airflow space allow air to enter from, for example, the open bottom, through the grill and across the plane of the window (e.g., to cool the window material), and out the top opening to be suctioned by a fume extractor for removal. This internal airflow space or tunnel can have an opening, allowing viewing of the interior cavity of the hood where welding operations can take place. This opening can be sealed with the same material as the window material and can be aligned with the window, so as to allow a welder outside the hood to view welding operations occurring inside the hood through the window on the outside of the hood.

In some embodiments, a grill or similar structure defines an internal airflow space adjacent to each window. The internal airflow space has a bottom inlet that is continuous with the open bottom of the removable hood to allow air to enter into the internal airflow space. The internal airflow space also has a top outlet to allow air to exit as it is suctioned by the fume extractor. Grills are positioned to optimally direct or guide air flow across window material, for example, to cool the window. This can allow the hood to withstand high temperatures used in welding operations while allowing operators to view the welding operations safely.

In some embodiments, the grill is positioned parallel and adjacent the window on the interior side of the removable hood. The grill is also spaced apart from the window to define an interior airflow space between the grill and the window. The spacing distance between the grill and the window can be based on the material of the hood or window, the temperatures reached, or requirements for optimal cooling of the window material, for example. The grill can be designed in a configuration to allow certain cooling parameters to be reached. For example, as shown, the grill can be shaped as a rectangular tube to provide maximum surface area for air flow to contact the window material. The grill can have parallel openings aligned with the window of the hood. The parallel openings define an internal window aligned with the window of the hood. The alignment can allow an operator outside the hood to view welding operations occurring inside the hood through the window.

In some embodiments, a hood can include grills to facilitate cooling of material, for example, window material. For example, in some embodiments for the grills to be positioned on the same sides as where there are windows. This can create a stream of cooling air to cool down the glass. The air flow can protect the glass from overheating, for example. The design of the grills can be selected to optimize direction/orientation, size, and number of openings so as to determine or guide the air flow in a desired way.

The hood can be made out of a variety of material. In some embodiments, the body of the hood is made from aluminum and the windows are made of heat resistant glass rated for arc welding. In some embodiments, the material of the body is light, easy to form, and a good heat conductor. For example, the hood can be made out of Aluminum Sheet metal 3003-H14 or similar. In some embodiments, the hood can be made out of carbon fiber.

In some embodiments, the window material is selected to have a desired level of shading for eye protection, for example, material with a shade range between 6 to 12. This can provide protection for operators using the hood to collect fumes from welding operations. In some embodiments, the windows can be covered by a layer of transparent heat resistance glass and a second layer of dark glass, for example.

In some embodiments, a skirt is attached to the bottom edge of the removable hood. For example, the skirt may be made of leather. This may provide added protection from welding operations.

The hood can have a variety of attachment mechanisms for engagement with a fume extractor. For example, a hood can have magnets on the top of the hood that attach to inside the fume extractor head. The attachment mechanism can be configured to work with any fume extractor.

The hood can have a variety of features. For example, the hood can be easily removable and have windows on each side with grills to allow air to move past the windows. The hood can attach to fume extractors such as the Lincoln Electric mobiflex. The hood can collect fumes from welding and simultaneously allow an operator to see the weld through the hood's windows.

The hood can be assembled through welding or, in the case of mass production, using a die. For example, a die and stamp may be used to construct the hood. The hood can form a variety of shapes to collect fumes effectively, for example. The shape of the hood can be designed to optimally cover a pipe at a welding zone or for aesthetics. In some embodiments, the hood can include a display that enables monitoring of welding parameters, for example, temperature or duration.

The size of the hood can be configured to optimally engage with the size of a pipe used in welding operations. For example, the hood size can be configured to match the pipe size. A hood can be in two or three different sizes for different pipe sizes. For example, a first size for 4" to 8" diameter pipe, a second size 2 for 8" to 12" diameter pipes, and a third size for above 12" pipes. In some embodiments, a single hood can be adjusted easily by an operator (e.g., expanded or shrunk) to engage with different pipe sizes. For example, in some embodiments the hood comprises arcuate portions formed by replaceable panels attached to a bottom portion thereof.

In some embodiments, the connection to a fume extractor could be different for different manufacturers of fume extractors. A variety of attachment mechanisms can be used, for example, clips, ties, latches. The attachment mechanism can be selected for quick connection to different stands. In some embodiments, the attachment mechanism can include two magnets or four magnets or other number of magnets to engage with a fume extractor. The number, location, or arrangement of magnets that can be used can be selected to affect how easily the hood can be attached and used.

A hood can provide many advantages. For example, a hood can be used in an automated welding context with a robotic welding system 1000. A hood can improve productivity. For example, for automated welding, the hood can give the operator freedom of moving and do other tasks close to station or operate another station. It can make their job easier and more ergonomic. A hood can improve safety. For example, the hood can confine fumes and directs them to an extractor. A hood can also operate as a flash screen and protect an operator and others from extreme arc light. A hood can be an improvement to welding operations as it can allow a welder to not have to use a hand held or helmet device, which can protect just one person (the welder).

In some embodiments, a hood can be used according to the following process. Firstly, the hood can be attached to the fume extractor using quick attachment mechanisms (e.g., magnets, etc.). Secondly, an operator can moves the hood by hand to locate the hood above a welding zone or welding operation. A self-support flex arm can hold the fume extractor and hood. This may allow the hood to be fixed in the right location easily. Thirdly, a welder can start the welding process. A fume extractor can start extraction automatically when the arc starts or is turned on by the operator before the weld starts. Fourthly, as welding progresses, fumes can be sucked in or collected by the fume extractor and carried by air flow. The operator can stay close to the weld and monitor the process through the one or more windows in the hood. Enclosed spaces adjacent to each window in the hood can allow air to be collected from outside the hood, passed across each respective window, and collected by the fume extractor or other collection device. The air flow can be guided to cool each respective window by grills attached in each enclosed space. The fume extractor can provide the air pressure difference or suction required to move air in this manner. A hood can change positioner welding on a pipe.

The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A removable hood for a fume extractor, the removable hood comprising:
    a welding shield for substantially covering a welding area to block arc light, the shield defining an internal cavity and having:
        a vent opening in an upper portion of the welding shield in fluid communication with the internal cavity;
        a welding opening in a rear portion of the shield for permitting introduction of a welding torch into the internal cavity;
        one or more viewing openings in one or more sides of the welding shield; and,
        a window assembly coupled to each of the one or more viewing openings, the window assembly comprising a grill frame configured to hold two layers of window material in a spaced apart relationship to define an internal airflow space between the two layers of window material such that the internal airflow space directs air flow to cool the two layers of window material when suction is applied to the vent opening,
    wherein a bottom portion of the welding shield has arcuate portions on either side thereof for placement adjacent to a pipe; and
    a removable attachment mechanism on the upper portion of the welding shield, the removable attachment mechanism being configured to selectively couple the vent opening to an extraction arm of the fume extractor, wherein the grill frame comprises a first window material support and a first spring pin for holding a first layer of the two layers of window material and a second window material support and a second spring pin for holding a second layer of the two layers of window material.

2. The removable hood of claim 1 wherein the removable attachment mechanism comprises an attachment frame extending upwardly from around the vent opening.

3. The removable hood of claim 2 wherein the attachment frame has a plurality of magnets attached to a top thereof.

4. The removable hood of claim 1 wherein the arcuate portions are provided on replaceable panels of the welding shield.

5. The removable hood of claim 1 comprising a curtain of a heat resistant flexible material around at least a portion of the welding shield arcuate portions to conform to the shape of the pipe.

6. The removable hood of claim 1 wherein the first layer comprises an auto-darkening filter and the second layer comprises a heat shield.

7. An apparatus for attachment to a fume extractor, the apparatus comprising:
    a welding shield for substantially covering a welding area to block arc light, the welding shield comprising an internal cavity containing the welding area and having a vent opening in an upper portion thereof, one or more viewing openings in one or more sides thereof, and open space at the rear and bottom portions thereof for respectively permitting introduction of a welding torch into the welding area and positioning the welding shield on a pipe; and
    a window assembly coupled to each of the one or more viewing openings, the window assembly comprising a grill frame configured to hold two layers of window material in a spaced apart relationship to define an internal airflow space between the two layers of window material, the internal airflow space shaped to direct air flow to cool the two layers of window material when suction is applied to the vent opening, wherein the grill frame comprises a first window material support and a first spring pin for holding a first layer of the two layers of window material and a second window material support and a second spring pin for holding a second layer of the two layers of window material.

8. The apparatus of claim 7 wherein the open space at the bottom portion of the welding shield comprises arcuate portions on either side thereof.

9. The apparatus of claim 7 comprising a removable attachment mechanism on the upper portion of the welding shield configured to selectively couple the vent opening to an extraction arm of the fume extractor, the removable attachment mechanism comprising an attachment frame extending upwardly from around the vent opening.

10. The apparatus of claim 7 wherein the first layer comprises an auto-darkening filter and the second layer comprises a heat shield.

11. An apparatus for blocking arc light and venting fumes from a welding area, the apparatus comprising:
    a welding shield comprising an upper portion having a vent opening therein, a plurality of side walls extending from the upper portion to substantially enclose the welding area, and an open bottom, wherein the side walls define a welding opening for permitting introduction of a welding torch into the welding area, at least one of the side walls has a viewing opening therein, and the bottom portions of at least two side walls comprise arcuate portions for facilitating placement of the welding shield adjacent to a pipe; and
    a grill frame coupled to each viewing opening, the grill frame comprising first and second window material supports configured to removeably hold a first layer of window material and a second layer of window material therein in a spaced apart relationship to define an internal airflow space between the two layers of window material shaped to direct air flow to cool the two layers of window material when suction is applied to the vent opening.

12. The apparatus of claim 11 further comprising a removable attachment mechanism on the upper portion of the welding shield, the removable attachment mechanism being configured to selectively couple the vent opening to a fume extractor.

13. The apparatus of claim 11 wherein the grill frame comprises a first spring pin for holding the first layer of window material within the first window material support and a second spring pin for holding the second layer of window material within the second window material support.

14. The apparatus of claim 11 wherein the first layer comprises an auto-darkening filter and the second layer comprises a heat shield.

* * * * *